Patented Nov. 23, 1937

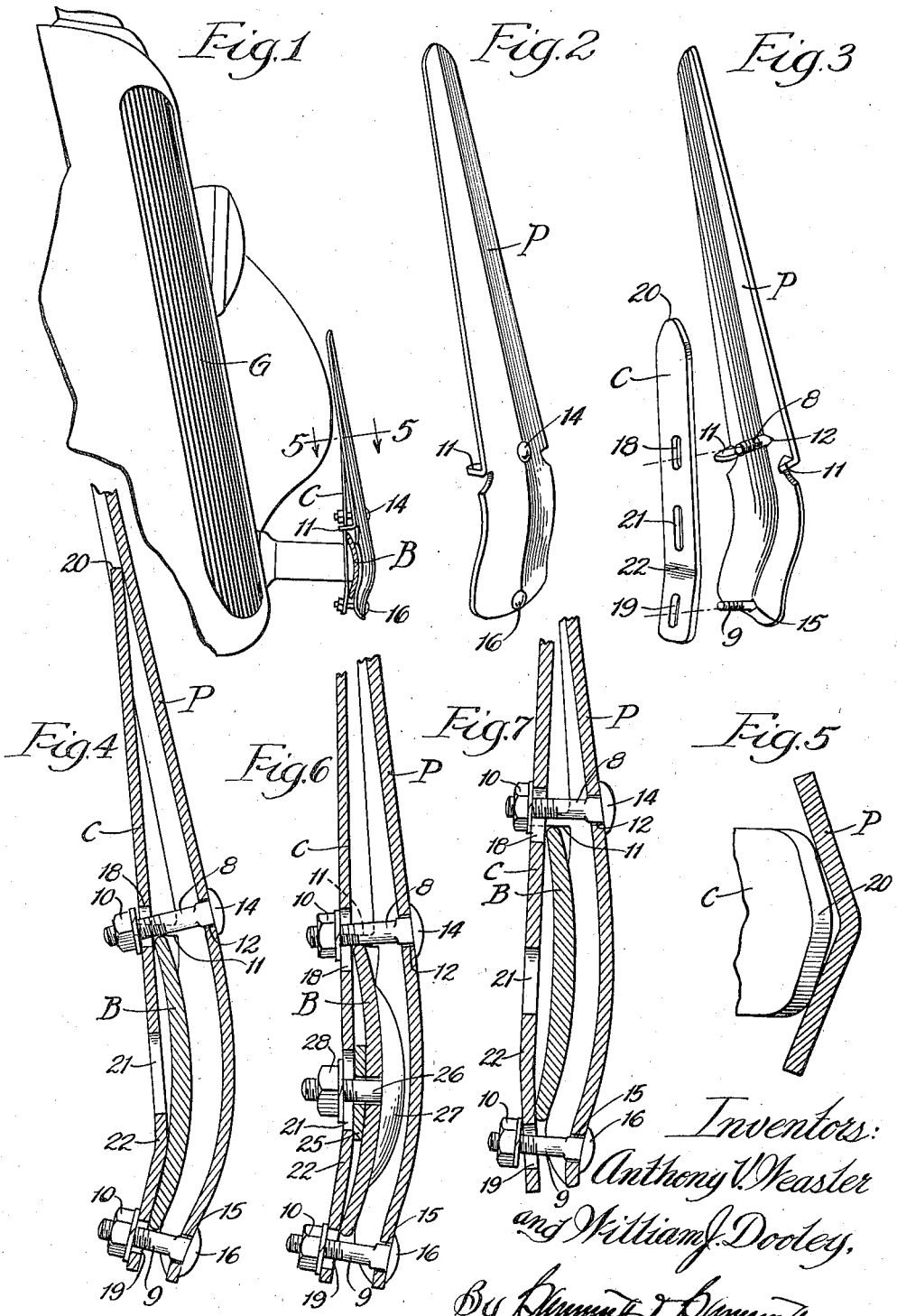

2,100,018

UNITED STATES PATENT OFFICE 2,100,018

GRILLE GUARD

Anthony V. Weasler and William J. Dooley, West Bend, Wis., assignors to Pick Manufacturing Company, West Bend, Wis., a corporation of Wisconsin Application January 8, 1937, Serial No. 119,552

5 Claims. (Cl. 293—55)

This invention relates to a guard attachable to either bumper of an automobile to afford protection to parts thereof which are located above the bumper level. In particular, such a guard is useful upon the front bumper where it will serve to protect the grille which is customarily provided to the front of the automobile radiator. When mounted upon the rear bumper such a guard will afford protection to the trunk or other fixtures upon the rear end of the automobile body just above the bumper level. It frequently happens that damage results from a relatively light impact which might have been absorbed by a protecting guard such as is disclosed herein.

It is accordingly an object of our invention to provide a guard attachable to either bumper of an automobile by means which will secure the guard fixedly in place and with such strength and rigidity as to furnish a substantial degree of protection to the adjacent automobile parts; to so construct the guard and its attaching parts that it may be applied without modification or special preparation to many types and styles of existing automobile bumpers; and to so fashion the guard itself that it will possess sufficient strength to be really serviceable in its intended capacity.

With these objects and purposes in mind, as well as others which will hereinafter appear, reference will be made to the accompanying drawing which exhibits a preferred embodiment of our invention in the manner following:

Figure 1 is a fragmentary side elevation of the front end of an automobile whose bumper appears in cross-section to exhibit thereon the present grille guard;

Fig. 2 is a perspective view of the guard per se, looking from the front;

Fig. 3 is a similar view showing a guard and its mounting cleat, looking from the rear;

Fig. 4 is a vertical section through the guard in its entirety together with a bumper bar whereon it is mounted;

Fig. 5 is a transverse section, on an enlarged scale, taken on line 5—5 of Fig. 1;

Fig. 6, which is a view similar to Fig. 4, shows the guard attached to a bumper of modified construction; and Fig. 7, which is a view similar to Fig. 4, shows the guard attached to a bumper having a slightly different transverse contour, the cleat being reversed in its position.

Automobiles of the present day are commonly equipped at the front end with a grille G behind which is concealed the radiator and other parts. Forwardly of the grille adjacent its base is the usual bumper B, usually in the form of a bar which is connected to supporting brackets near its opposite ends. This bar may have a convex forward face together with a concave inner face, as shown, or be otherwise contoured.

The present guard is designed for attachment to such a bumper, preferably at a point midway of its length. As shown, the guard comprises (1) an elongated plate P from which are extended rearwardly (2) a pair of bolts 8 and 9 the latter adjacent the bottom of the plate, and (3) a cleat C having certain slots through which the bolts may pass. The plate is adapted to be fitted against the front face of the bumper, the two bolts extending above and below, but spaced from, its upper and lower edges, respectively, to pass through slots in the cleat which lies against the inner face of the bumper. With the parts so related, nuts 10 are then applied to the bolts to secure the guard fixedly to the bumper.

The guard plate is specially formed in the following way: at a point remote from its lower end a distance slightly in excess of the transverse dimension of the bumper for which it is designed, tines 11 are struck from opposite edges of the plate and rearwardly bent to afford a pair of spaced shoulders adapted to rest upon the top edge of the bumper bar. The vertical position of the guard plate is thereby fixed. An opening 12, preferably square, having its lowermost point just above the level of the shoulders is formed through the guard plate for the reception of the upper bolt 8 which may be of carriage style with a squared shank adjacent its head 14 which is fitted against the front face of the guard plate. From top to bottom this plate is preferably ridged for longitudinal reinforcement, the ridge, in the construction shown, being produced by an angled formation of the plate. This feature also enhances the beauty of the guard, which in practice may be chromium plated, with differing reflections on opposite sides of the ridge. In contour the guard is tapered gradually from its shoulders upwardly to the top end where it is rounded off in a symmetrical fashion. Below the shoulders the side edges of the guard are extended in parallelism so as to provide, in effect, a rectangular base portion. In a longitudinal direction this base portion is also bowed rearwardly so as to better conform to the usual convex curvature of the forward face of the bumper against which the guard is fitted. Through the base adjacent its lower edge is an opening 15, preferably square, for receiving the bolt 9 which may be of carriage style with the squared portion of its shank locked against rotation within the guard plate, the bolt head 16 being rested upon the front face of the bumper, as shown.

The cooperating cleat is in the form of a small plate having two longitudinally disposed slots 18 and 19 for the reception of the bolts 8 and 9, respectively, thereby permitting, as needed, some slight longitudinal adjustment of the cleat relative to the bumper bar. The upper end of the cleat has a pointed nose 20 adapted to engage against the rearward face of the bumper plate within the trough or angle thereof. A third slot 21 aligned with the other slots 18 and 19 may also be provided in the cleat, as shown.

A grille guard answering to this description is attachable without change to practically all automobile bumpers of the present day. Three examples of such bumpers are indicated in Figs. 4, 6, and 7. In every case the shoulders 11 are positioned upon the top edge of the bumper bar so as to sustain the weight of the grille guard. The cleat, as shown, is desirably bent slightly at a point 22 near its lower end so as to better conform to the concave curvature of the bumper bar, as shown in Fig. 4. When so positioned the two bolts 8 and 9 are extended through both the guard plate and cleat permitting application thereto of nuts (desirably with associated spring washers) which bear against the rear face of the cleat. By tightening these nuts to the appropriate degree the cleat and guard plate will be clamped against opposite faces of the bumper bar with the upper nose end of the cleat pressing against the rear face of the guard plate to furnish a bracing therefor at a point well above the level of the bumper bar upon which it is mounted. By reason of the concave character of the rear face of the guard the cleat is centered with respect thereto and held against lateral shifting movement.

In Fig. 6 the bumper bar which is also of a conventional type is reinforced longitudinally by a back bar 25 held in place with a bolt 26 having an ornamental head 27 which lies upon the forward face of the bumper bar. With such a construction, the bolt 26 may be passed through the central slot 21 in the cleat so that its nut 28 may be made to bear against the rear side of the cleat, all as shown in the drawing.

In certain cases the installation will be rigidified by reversing the cleat so that the bend near its lower end will extend forwardly toward the guard plate, as shown in Fig. 7. Because of the reversibility of the cleat to meet special conditions, the grille guard in its entirety is adaptable to many types and kinds of bumpers without modification of any of its parts.

In the preceding description we have referred to a guard in relation to the front bumper of an automobile, and the terms used have accordingly been appropriate in that connection. It is to be understood, however, that a guard of exactly the same construction is applicable without change or modification of any kind to the rear bumper of an automobile, in which event it furnishes a protection extending well above the bumper level to the structure or fixtures at that end of the car. In practice it is found that such a guard will prevent injury in many cases where, without such a guard, a slight blow or impact would produce damage, or disfigure the body or fixtures, just above the bumper level.

We claim:

1. A grille guard comprising a vertical plate, means extending rearwardly from the plate at a point near its lower end adapted to rest upon the upper edge of a supporting bumper whereby to sustain the plate thereon with the major portion of its length thereabove, and a cleat engageable with the supporting bumper and plate in adjustable connection with the plate and exerting a bracing pressure against the plate at an elevated point remote from the bumper.

2. A grille guard comprising a plate, a pair of spaced shoulders extending rearwardly from the plate adapted to rest upon the upper edge of a supporting bumper whereby to sustain the plate, a cleat extending from a point adjacent the lower end of the plate substantially above the bumper level and adapted to engage the supporting plate at an elevated point remote from the bumper, and means extending between the plate and the cleat adapted to draw the one tightly toward the other upon opposite sides of the supporting bumper and to press the upper end of the cleat against the plate at a point remote from the bumper whereby to furnish a brace therefor.

3. A grille guard comprising a vertical plate, means for securing the lower end of the plate against one face of a bumper bar with the upper end of the plate extending thereabove comprising bolts extending rearwardly from the plate past opposite edges of the bumper bar in spaced relation thereto, an apertured cleat engageable with the opposite face of the bumper bar adapted to receive therethrough the bolts extending from the plate, the upper end of the cleat being extended well above the bumper bar for engagement with the plate at a point remote from the bumper whereby to afford a brace therefor, and nuts applicable to the bolts adapted to draw the plate and cleat toward each other tightly against opposite faces of the bumper bar while pressing the upper end of the cleat against the plate to afford a brace therefor at a point remote from the bumper.

4. A grille guard comprising a plate having a longitudinal reinforcement, tines extended rearwardly from the plate to provide a pair of spaced shoulders adapted to rest against the upper edge of a supporting bumper, the lower end of the plate below the shoulders being rearwardly curved to conform generally with the transversely bowed contour of a supporting bumper and the upper portion of the plate extending upwardly in a generally straight direction, and a cleat engageable with the rearward face of the bumper bar with its upper end extended above the bumper level for engagement with the plate at an elevated point remote from the bumper whereby to afford a brace rearwardly thereof at such point, and means for adjustably clamping the cleat and plate against opposite faces of the bumper bar and pressing the cleat against the plate at a point substantially above the bumper level.

5. In combination with an automobile bumper, a guard comprising a plate, a cleat and an adjustable connection therebetween, the plate and cleat being adapted to occupy positions upon opposite faces of the bumper with the adjustable connection adjacent one edge thereof, and the plate and cleat being extended upwardly for mutual engagement at a point remote from the bumper, the adjustable connection being adapted to clamp the plate and cleat against the bumper and against each other at an upper point remote from the bumper whereby to afford a brace for the plate.

ANTHONY V. WEASLER.
WM. J. DOOLEY.